Feb. 3, 1970    E. M. NAURECKAS    3,492,886
QUICK ACTING SCREW-THREADED DEVICE
Filed Oct. 25, 1967    2 Sheets-Sheet 1
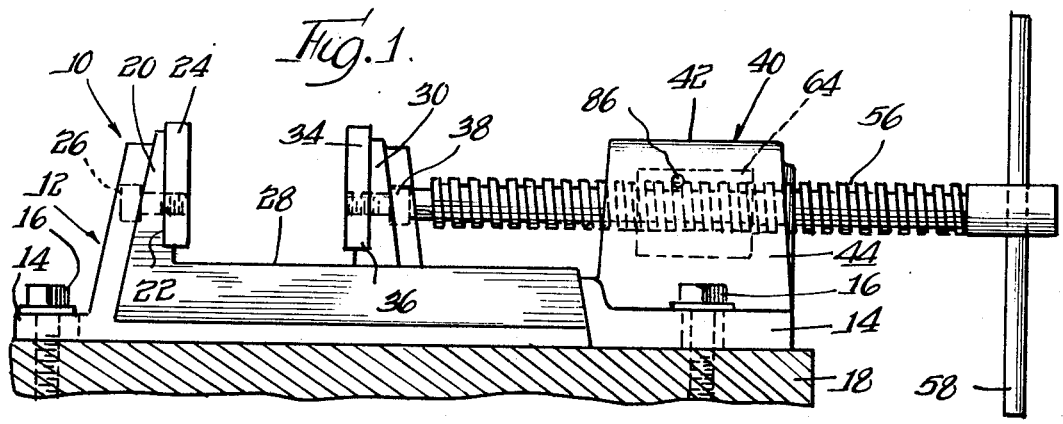
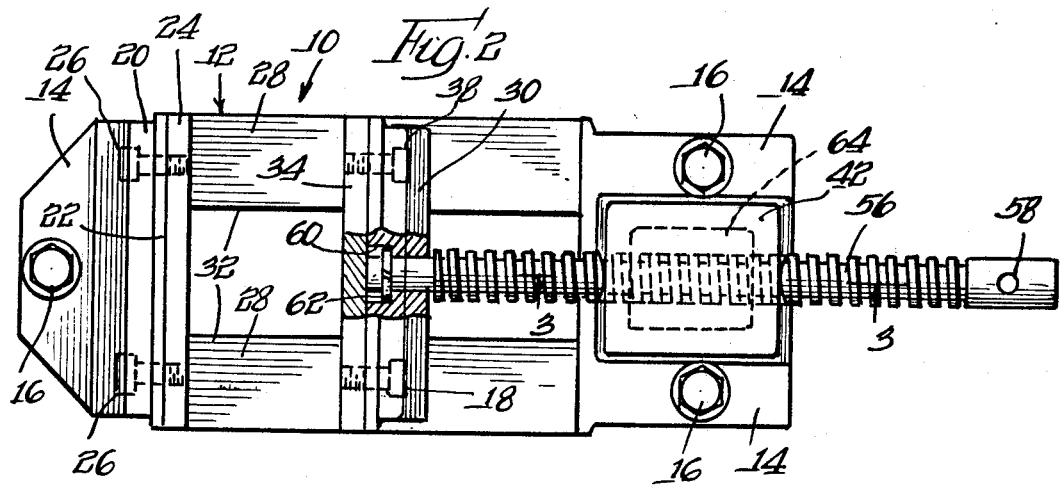
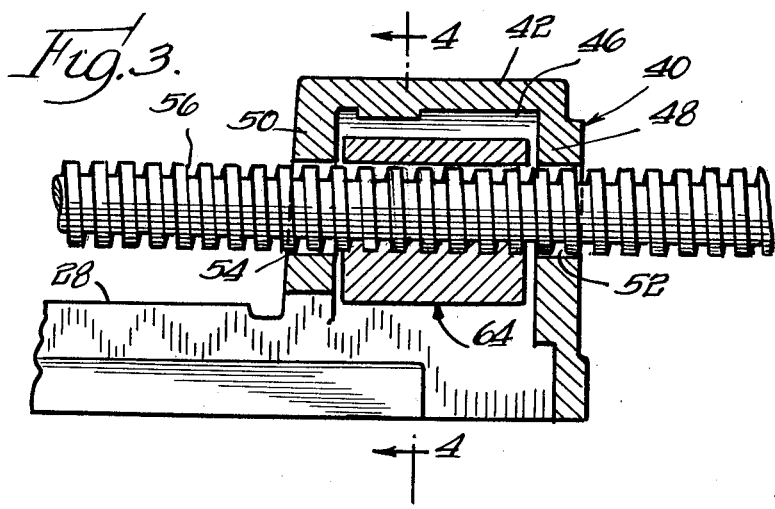
Inventor
Edward M. Naureckas
By: Olson, Trexler, Wolters & Bushnell attys Feb. 3, 1970  E. M. NAURECKAS  3,492,886
QUICK ACTING SCREW-THREADED DEVICE
Filed Oct. 25, 1967  2 Sheets-Sheet 2
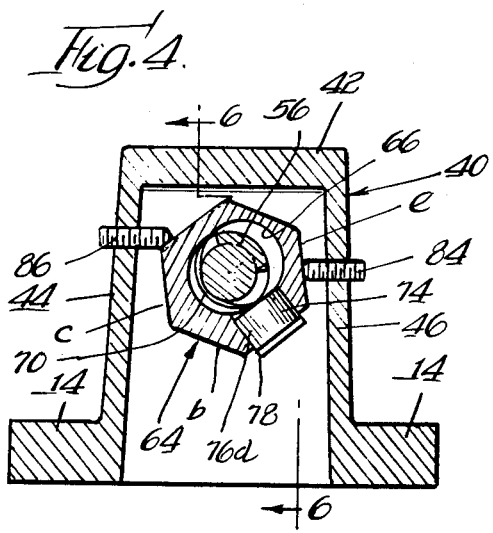
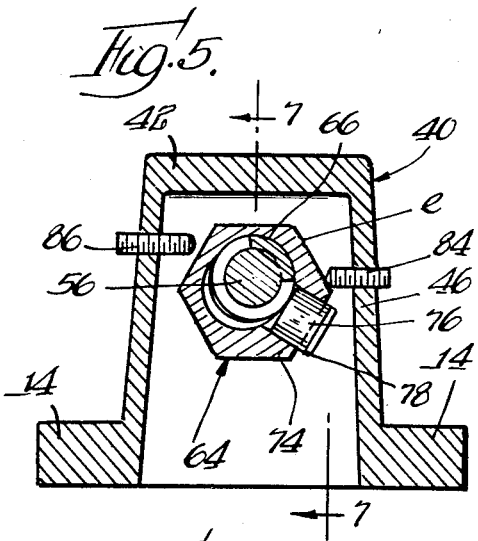
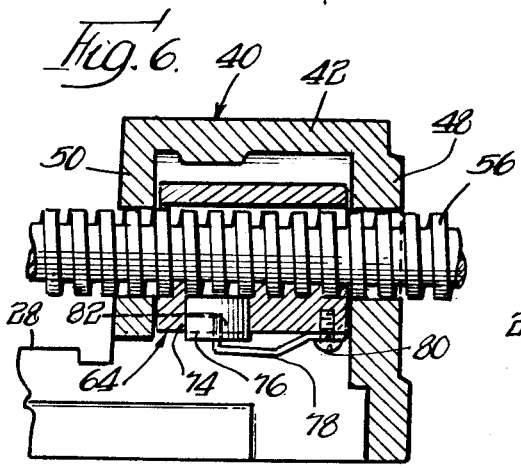
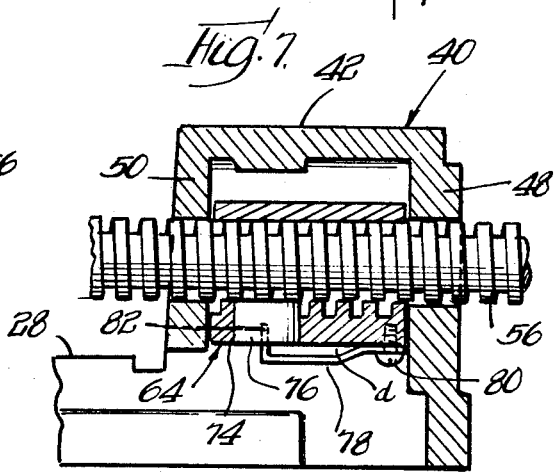
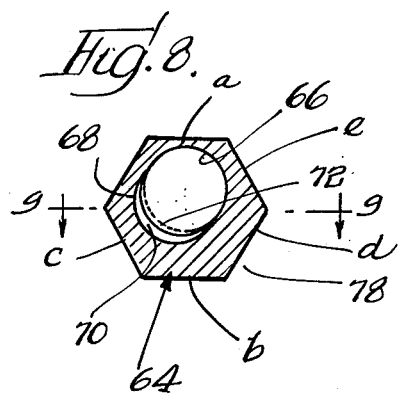
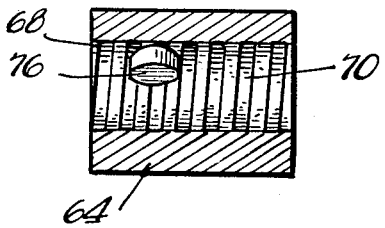
Inventor
Edward M. Naureckas
By: Olson, Trexler, Wolters & Bushnell
attys.

United States Patent Office 3,492,886
Patented Feb. 3, 1970

3,492,886
QUICK ACTING SCREW-THREADED DEVICE
Edward M. Naureckas, Gurnee, Ill., assignor to Wilton Corporation, Schiller Park, Ill., a corporation of Illinois
Filed Oct. 25, 1967, Ser. No. 677,950
Int. Cl. F16h 1/20; B25b 1/02
U.S. Cl. 74—424.8     9 Claims

ABSTRACT OF THE DISCLOSURE

A screw-threaded device as for use in a vise or other clamping mechanism which includes a threaded shaft or spindle received in a partially threaded nut, the threaded shaft being axially movable under an axial actuating force at rapid rate, and being incrementally advanced axially by a rotative force, the screw threads of the shaft or spindle being automatically moved into or out of engagement with the partial threads of the nut upon rotation of the shaft in advancing or retracting direction.

---

In the use of various types of clamping devices or apparatus, such as vises, C-clamps, work-holding clamps, etc., it often is desirable or necessary to allow one clamping member or jaw to retract rapidly from the vicinity of a workpiece, and, conversely, to provide for rapid advancement into engagement with a workpiece, and thereafter more slowly to advance with considerable clamping force to grip the workpiece in position. Devices of this type are known in the prior art, and probably the best and most prevalent is that disclosed and claimed in Farrell U.S. Letters Patent 2,430,458. In the aforesaid patent the partially threaded nut is elliptical in shape, and cooperates with a curved wall of a base or mounting structure whereby the nut is cammed in and out of screw-threaded relation with the screw-threaded shaft, depending on the direction of rotation of the shaft. Although this device works satisfactorily, it is expensive to manufacture. The elliptical nut must be cast, and as will be realized, it is very difficult to hold close tolerances in casting techniques. The base or supporting frame also must be held to rather close tolerances, and by its very shape and nature this base must also be cast. Thus, there are two cooperating cast pieces which must be held to very close tolerances. This is expensive to achieve in manufacture, and is accompanied by either a high percentage of rejects, or an expensive hand finishing operation.

Accordingly, it is an object of the present invention to provide a quick acting screw-threaded device which retains the advantages of the most successful prior art patent devices, and which is much less expensive to manufacture.

It is a further object of the present invention to provide such a quick acting screw-threaded device which uses a partially threaded nut member made from readily available stock at a low price at tolerances closer than are really necessary.

It is a further object of the present invention to provide a quick acting screw-threaded device having a base which may be made by the most economical metal fabricating techniques, and which need not be held to particularly close tolerances.

More specifically, it is an object of the present invention to provide a quick acting screw-threaded device wherein a partially threaded nut member is made of commercially available polygonal bar stock, such as hexagonal, and wherein the base is provided with adjustable set screws engageable therewith to shift the nut member in and out of threaded engagement with an actuating screw or shaft.

Other and further objects and advantages of the present invention will be apparent from the following description when taken in connection with the accompanying drawings wherein:

FIG. 1 is a side or elevational view of a vise constructed in accordance with the present invention;

FIG. 2 is a top or plan view thereof, part being broken away;

FIG. 3 is an axial sectional view on an enlarged scale as taken substantially along the line 3—3 in FIG. 2;

FIG. 4 is a cross-sectional view as taken substantially along the line 4—4 of FIG. 3;

FIG. 5 is a view similar to FIG. 4 showing the parts in a different position of operation;

FIG. 6 is a fragmentary longitudinal sectional view somewhat similar to FIG. 3 and taken generally along the line 6—6 in FIG. 4;

FIG. 7 is a view in longitudinal section generally similar to FIG. 6, and taken substantially along the line 7—7 in FIG. 5;

FIG. 8 is a cross-sectional view through the partially threaded nut member; and

FIG. 9 is a longitudinal sectional view therethrough substantially along the line 9—9 in FIG. 8.

Although the invention is equally well applicable to C-clamps, to machine tool work-holders, and to other devices of more general use, the present illustration is of a vise. Thus, referring more particularly to the figures of the drawings, and first to FIGS. 1 and 2, there will be seen a vise 10 comprising a one-piece body or frame 12. The body or frame may be of any suitable construction, and for some purposes could be pressed from heavy gauge sheet material. However, in the illustrative embodiment the body or frame comprises an iron or steel casting. The body or frame 12 includes horizontally extending flanges 14 through which bolts 16 conveniently are passed to secure the vise to a supporting table 18 or the like.

At one end of the body (the left end in FIGS. 1 and 2) there is an integral upstanding tail piece 20 having a forwardly facing seat 22 in which a work backup or gripping plate 24 is secured by means such as screws or bolts 26 passing through the tail piece and threaded into the plate 24. As will be appreciated in at least some instances the tail piece could, by itself, be used as a backup member or fixed jaw. The inclusion of the work-gripping or backup face or plate 24 is conventional, and this may be provided to insure a flat work-gripping surface, or one of whatever shape may be desired.

The frame or body 12 further includes a pair of spaced-apart, parallel, upwardly directed ways 28 on which a movable vise jaw 30 is slidable. The movable jaw 30 includes a depending tongue (not shown) engageable with vertical ways 32 contiguous to the horizontal ways 28. An underlying stabilizing plate (also not shown) is secured by means such as screws to the under side of the depending tongue, and engages undercut ways spaced below the ways 28 and downwardly facing to prevent the movable jaw 30 from moving up. Such mounting of the movable jaw is conventional, and therefore need not be shown in detail. A face plate 34 is secured in a seat 36 on the movable jaw by means such as bolts 38, again for the purpose of providing whatever type of work-engaging surface might be desirable.

At the end of the frame 12 opposite to the tail 20 there is an upstanding head 40 of downwardly opening, generally boxlike configuration. This head, as further will be seen with reference to FIGS. 3–7, is integral with the remainder of the frame, and includes a horizontal top wall 42 and downwardly extending, slightly diverging side walls 44 and 46. The head 40 also includes integral front and rear end walls 48 and 50, respectively, provided with axially aligned apertures 52 and 54, respectively, being of a common diameter and of such size as to accommodate the outside diameter of a threaded shaft or spindle 56. In the illustrative example, the screw thread is of the type having a flat crest and a flat root, the flanks also being substantially flat. In accordance with common practice, the outer or front end of the threaded shaft or spindle 56 is not threaded, and is provided with a cross pin 58 for turning of the shaft. The opposite end of the threaded shaft 56 is of approximately the same diameter as the thread root, and is secured in a recess 60 in the movable jaw 30 behind the face plate 34 by conventional means such as a split ring or C-washer 62 received in a circumferential groove.

A nut member 64 (seen best in FIGS. 3–9) is received within the head 42 and is of an axial length (see FIGS. 6 and 7) such as to extend almost from the end wall 48 to the end wall 50. The nut member is made of a commercially available bar stock having a polygonal external configuration, and in the specific example herein shown and described it is hexagonal bar stock that is used. The material preferably is steel, and the cross section is that of an equilateral hexagon.

The nut member 64 is provided with an axially directed bore 66 eccentric to the central axis of the nut. The bore 66 is relatively closest to one of the nut faces $a$, and is relatively remote from the opposite face indicated at $b$. The center of the bore 66 lies on a vertical median plane, with the nut in the position shown in FIG. 8. The bore 66 has a smooth interior wall, and is of such diameter as slidingly to receive the threaded shaft 56, the diameter of the bore 66 thus being very slightly greater than the crest diameter of the shaft 56.

The nut member further is provided with a second eccentric bore section 68, this second bore section being offset from the bore 66 and provided with partial threads 70 complementary to the threads of the shaft 56. The partially threaded bore section 68 is of substantially the same diameter as the bore 66, and is offset from the axis of the bore 66 somewhat toward the nut face $b$, and even more so toward adjacent nut face $c$. The inside diameter of the threads 70, as indicated at 72, is spaced out radially slightly past the nominal circumference of the bore 66 so that the partial threads 70 may readily clear the threads of the sahft 56, as will be pointed out hereinafter.

Relatively near one end the nut member 64 is provided with a radial bore 74 extending in from nut face $d$ (the face on the other side of $b$ from face $c$), and a steel friction pad or clutch member 76 is received in this bore. A steel leaf spring 78 is secured to the face $d$ of the nut by means such as a screw 80 extending through the end of the spring and threaded into the nut member. The spring at the opposite end is provided with a right angle tang 82 received in a slot in the back face of the friction pad 76 for holding the pad or clutch member frictionally in engagement with the threads of the shaft 56, thus tending to cause the nut member to turn with the shaft.

With reference now to FIGS. 4 and 5, a set screw 84, conveniently having a recessed hexagonal driving socket, is threaded through the side wall 46 of the head, and is centered on a horizontal median plane through the axis of the threaded shaft 56. The set screw has a beveled tip which, under conditions of operation shortly hereinafter to be described, is engageable with face $e$ of nut member 84. A second set screw 86 of similar nature is threaded through the side wall 44 at a level above the set screw 84. The set screw 86 is horizontal, and is approximately tangent to the threads of the shaft 56 at the top portion thereof.

When the shaft 36 is rotated in a counterclockwise direction as viewed from the front end of the shaft 56, the friction pad or clutch member 74 causes the nut to turn with the shaft, thus bringing face $e$ of the nut member into engagement with the end of the set screw 84. This causes the nut member to be cammed to the left in FIG. 5, thereby bringing the smooth bore 66 into axial alignment with the shaft 56. In this position the shaft can be shifted axially and free of rotation back and forth quite rapidly, whereby to advance or retract the jaw 30 and face plate 34.

Conversely, the shaft 56 can be rotated in a clockwise direction, and this generally is done after the shaft has been advanced axially as just described. The friction member 76 causes the nut to turn in a clockwise direction with the shaft, thus bringing face $f$ of the nut into engagement with the set screw 86. This causes the nut member to be shifted to the right, whereupon face $e$ again engages set screw 84, but in a different position, the partial threads 70 of the nut member thus being brought into mesh with the threads of the shaft 56. Upon continued clockwise rotation of the shaft, the jaw 30 is advanced at a slower rate in accordance with the rate of rotation of the shaft and with the lead of the thread thereon, and with considerable force, whereby tightly to grip or clamp the workpiece between the plates 24 and 34.

Upon completion of work on the workpiece, the shaft again is turned in a counterclockwise direction to free the nut from the shaft, whereby the shaft can be axially retracted at a rapid rate. As will be understood, the direction of rotation has been discussed in connection with the conventional right-hand thread.

The hexagonal or other polygonal bar stock used for the nut member is readily obtained in commerce to very close tolerances and at a reasonable price. The nut member therefore is simple and inexpensive to produce. The provision of the set screws 84 and 86 as stops which cam against the flat faces of the nut member obviate the necessity of holding any part of the head to very close tolerances, since the set screws readily can be threaded in and out as may be necessary to compensate for individual variations in castings.

Various changes in structure will no doubt occur to those skilled in the art, and will be understood as forming a part of the present invention.

The invention is claimed as follows:

1. A quick acting screw-threaded device comprising base means, a screw-threaded shaft supported by said base means for rotation and axial movement, a nut member, said nut member having an exterior, flat-faced, polygonal configuration, said nut member having axially extending bore means therethrough with partial thread means on one side thereof selectively engageable with and separable from said threaded shaft, and a pair of spaced stops carried by said base means, said shaft in one direction of rotation turning said nut member against one of said stops and said one stop camming said nut into threaded engagement with said shaft and resisting further turning of said nut member whereby said shaft is screw-threadedly advanced by rotation of said shaft, said shaft in the other direction of rotation turning said nut member against the other of said stops, said other stop camming said nut member away from threaded engagement with said shaft, said shaft thereupon being free for rapid axial advancement.

2. A screw-threaded device as set forth in claim 1 wherein said nut member includes an insert resiliently engaging said shaft and tending to turn said nut member with said shaft.

3. A screw-threaded device as set forth in claim 1 wherein said polygonal configuration is that of a regular polygon.

4. A screw-threaded device as set forth in claim 3 wherein said regular polygon comprises a regular hexagon.

5. A screw-threaded device as set forth in claim 1 wherein said bore means comprises a bore which is eccentric relative to said nut member.

6. A screw-threaded device as set forth in claim 5 wherein said bore means further includes a second partial bore offset from the first-mentioned bore and having the partial thread means therein.

7. A screw-threaded device as set forth in claim 1 wherein said stops comprise screw members threadedly supported by said base means and screw-threadedly adjustable.

8. A screw-threaded device as set forth in claim 1 wherein one of said stops is disposed substantially in a horizontal median plane through said shaft, and wherein the other stop is positioned above said plane.

9. A screw-threaded device as set forth in claim 8 wherein said stops comprise screw members threadedly supported by said base means and screw-threadedly adjustable.

References Cited

UNITED STATES PATENTS

| 788,716 | 5/1905 | Hammond et al. | 74—424.8 |
| 2,424,037 | 7/1947 | Jenkins | 74—424.8 |
| 2,430,458 | 11/1947 | Farrell | 74—424.8 |

FOREIGN PATENTS 9,891   5/1905   Great Britain.

LEONARD H. GERIN, Primary Examiner

U.S. Cl. X.R.

74—459; 269—182